United States Patent
Blackmore et al.

(10) Patent No.: US 7,073,536 B2
(45) Date of Patent: Jul. 11, 2006

(54) APPARATUS, METHODS, AND LINERS FOR REPAIRING CONDUITS

(75) Inventors: Richard D. Blackmore, Houston, TX (US); Mark T. Sloan, Spring, TX (US); William M. Lepola, Magnolia, TX (US)

(73) Assignee: Verline INC, Houston, TX (US)

( * ) Notice: Subject to any disclaimer, the term of this patent is extended or adjusted under 35 U.S.C. 154(b) by 129 days.

(21) Appl. No.: 10/182,889

(22) PCT Filed: Feb. 2, 2001

(86) PCT No.: PCT/US01/03498

§ 371 (c)(1),
(2), (4) Date: Apr. 28, 2003

(87) PCT Pub. No.: WO01/61236

PCT Pub. Date: Aug. 23, 2001

(65) Prior Publication Data

US 2003/0213556 A1 Nov. 20, 2003

Related U.S. Application Data

(60) Provisional application No. 60/179,806, filed on Feb. 2, 2000, provisional application No. 60/179,687, filed on Feb. 2, 2000, provisional application No. 60/179,686, filed on Feb. 2, 2000.

(51) Int. Cl.
*F16L 55/16* (2006.01)

(52) U.S. Cl. .................. 138/98; 138/97; 156/287; 156/294; 264/269; 405/105.1

(58) Field of Classification Search ........... 138/97, 138/98; 156/287, 294, 423, 380.5, 275.5; 264/269, 267; 405/150.1; 219/535, 547, 219/544
See application file for complete search history.

(56) References Cited

U.S. PATENT DOCUMENTS

| | | | |
|---|---|---|---|
| 3,290,197 A | 12/1966 | Carmody | 156/171 |
| 5,010,440 A | 4/1991 | Endo | 138/97 X |
| 5,223,189 A * | 6/1993 | Friedrich | 264/31 |
| 5,451,284 A | 9/1995 | Ikeda et al. | 156/247 |
| 5,451,351 A * | 9/1995 | Blackmore | 264/449 |

(Continued)

FOREIGN PATENT DOCUMENTS

DE    40 14 400 A1    11/1991

(Continued)

OTHER PUBLICATIONS

Communication from the European Patent Office including International Search Report from PCT/US01/13245, Mar. 14, 2002.

(Continued)

*Primary Examiner*—Patrick Brinson
(74) *Attorney, Agent, or Firm*—David McEwing

(57) ABSTRACT

An apparatus and method for repairing the juncture or intersection of a first conduit and a second conduit is disclosed. The apparatus includes a main body for transporting and positioning a repair material impregnated with at heat curable resin system or matrix. An inflation device carried within the main body positions and compresses the repair material against the intersection. This includes a portion of the interior of the second conduit and flange portion in the first conduit. The inflation device includes conductive fibers that are electrically conductively heated to effect curing of the resin in the repair material.

26 Claims, 14 Drawing Sheets

U.S. PATENT DOCUMENTS

| | | | |
|---|---|---|---|
| 5,501,248 A | 3/1996 | Kiest, Jr. | 138/98 |
| 5,525,049 A | 6/1996 | Paletta | 425/62 |
| 5,606,997 A * | 3/1997 | Blackmore et al. | 138/98 |
| 5,615,470 A | 4/1997 | Ceraso | 29/469.5 |
| 5,624,629 A * | 4/1997 | Wood | 264/516 |
| 5,632,952 A | 5/1997 | Mandich | 138/97 X |
| 5,656,231 A | 8/1997 | Blackmore | 264/408 |
| 5,915,419 A | 6/1999 | Tweedie et al. | 138/98 |
| 5,927,341 A * | 7/1999 | Taylor | 138/98 |
| 5,950,682 A * | 9/1999 | Kiest, Jr. | 138/98 |
| 6,001,212 A * | 12/1999 | Polivka et al. | 156/287 |
| 6,029,726 A * | 2/2000 | Tweedie et al. | 156/423 |
| 6,039,079 A * | 3/2000 | Kiest, Jr. | 138/98 |
| 6,068,725 A * | 5/2000 | Tweedie et al. | 156/287 |
| 6,206,049 B1 * | 3/2001 | Ward | 138/98 |
| 6,227,764 B1 * | 5/2001 | Einhaus et al. | 405/157 |
| 6,688,337 B1 * | 2/2004 | Ward | 138/98 |

FOREIGN PATENT DOCUMENTS

| | | |
|---|---|---|
| DE | 42 38 982 A1 | 5/1994 |
| DE | 44 45 605 C1 | 3/1996 |
| EP | 0 353 362 | 2/1990 |
| EP | 0 499 894 | 8/1992 |
| EP | 0 887 584 A1 | 12/1998 |
| FR | 2542416 | 9/1984 |
| FR | 2637534 | 4/1990 |
| GB | 945911 | 1/1964 |
| JP | 01008041 A | 1/1989 |
| JP | 2-158323 | 6/1990 |
| JP | 06234161 | 8/1994 |
| JP | 07108783 A | 4/1995 |
| WO | WO 85/03906 | 9/1985 |

OTHER PUBLICATIONS

Communication from the European Patent Office including International Search Report from PCT/US01/40021, Aug. 6, 2002.

Communication from the European Patent Office including International Search Report from PCT/US01/03498, Sep. 14, 2001.

* cited by examiner

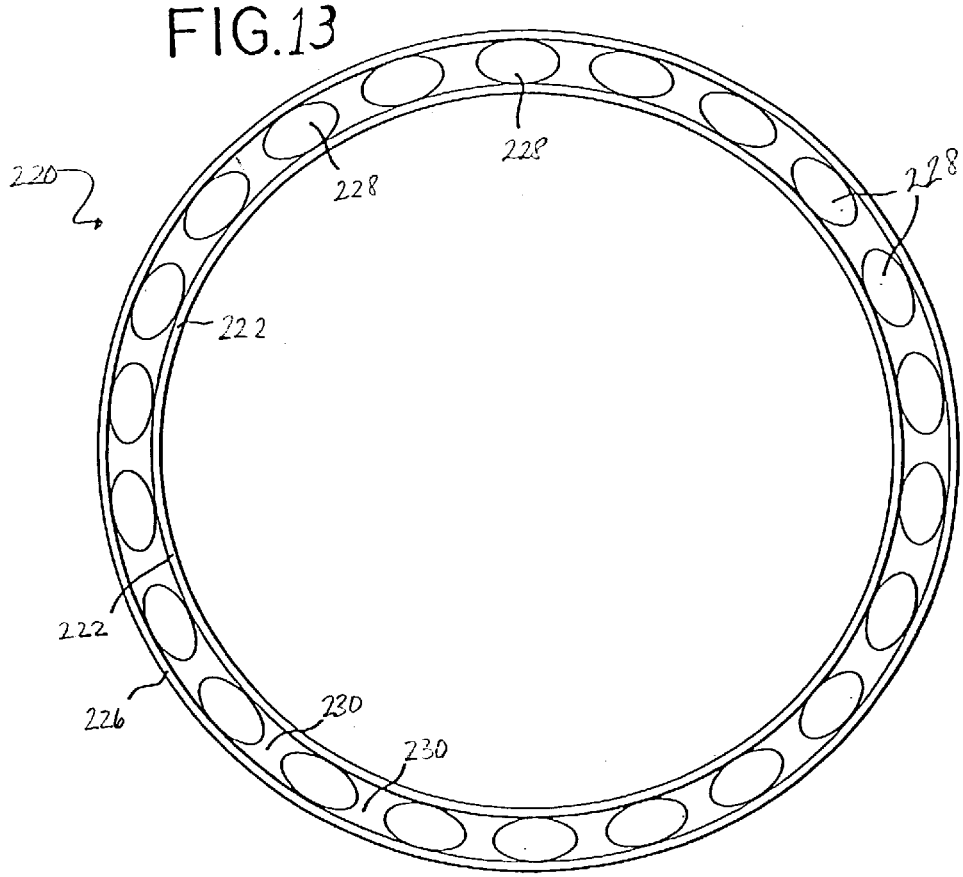
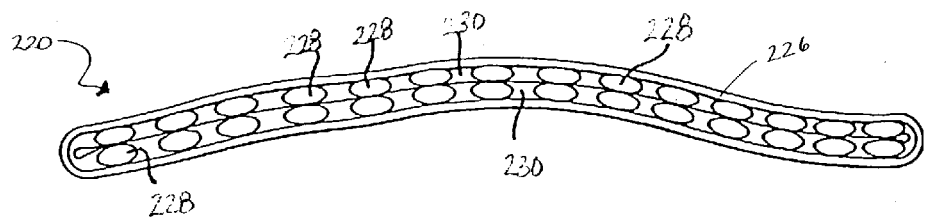

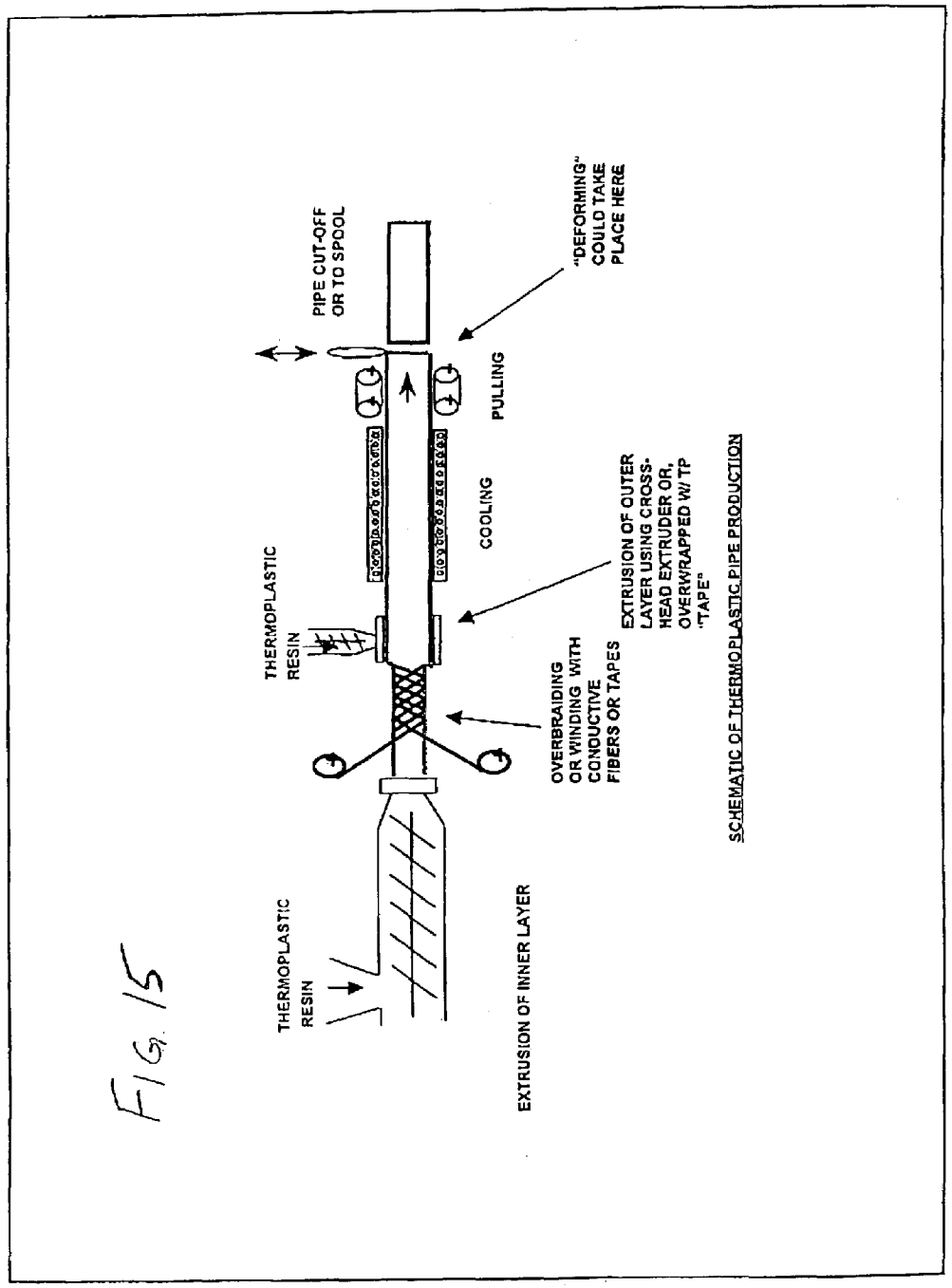

APPARATUS, METHODS, AND LINERS FOR REPAIRING CONDUITS

RELATED CASES

"This Application is a U.S. National filing under §371 of International Application No. PCT/US01/03498, filed 2 Feb. 2001, claiming priority from U.S. Ser. Nos. 60/179,806 (filed Feb. 2, 2000), 60/179,687 (filed Feb. 2, 2000) and 60/179,686 (filed Feb. 2, 2000), (which are hereby incorporated by reference)."

TECHNICAL FIELD

The present invention generally relates to an apparatus and method for the installation of a repair material within a conduit or pipe such as a sanitary sewer line. More specifically, the invention pertains to an apparatus and method for the installation of a repair material at the intersecting junction between two transversely opposed pipes or conduits.

The present invention also relates to a method and apparatus for repair of large diameter sanitary sewer pipe or conduit. Specifically, the invention pertains to an advanced method and liner apparatus for the in-situ repair of conduits having large diameters.

Additionally, the present invention relates to a method and apparatus for forming a spoolable composite pipe. More specifically, this invention pertains to a method for the in-situ formation of spoolable composite pipe and the in-situ repair of damaged conduit with the spoolable composite pipe.

BACKGROUND OF THE INVENTION

It is generally accepted that the aging infrastructure worldwide is fast approaching originally designated design lives. Specifically, pipes and conduits located both above and below ground employed in the conveyance of liquids frequently require repair to prevent leakage into the system as well as preventing fluid from the leaving the system. The cause of leakage can vary from improper installation to environmental conditions to normal aging or the detrimental effects of the substances transported on the pipe materials. Regardless of the cause, leakage is undesirable. The United States Congress and the US Environmental Protection Agency have both mandated reductions in such leakage through such means as the Clean Water Act.

Because of the high costs and the level of difficulty involved in excavating or removing and replacing leaking conduits, various methods have been devised for insitu repair. These methods have minimized the expense and hazards associated with digging and replacing defective pipes.

In the conventional processes for the insitu rehabilitation of existing pipes and conduits, a flexible tubular liner impregnated with a thermosetting synthetic resin matrix is introduced into the conduit using an inverting process as well know to one skilled in the art. In U.S. Pat. No. 5,108,533, the flexible tubular liner is comprised of a needle-punched felt material. In conditions where the intersecting angles of the main pipe and the lateral pipe constitute an obtuse angle, as typically encountered in a convention sewer "wye", a needle-punched felt material does not possess the necessary flexibility to conform well to the surrounding pipe walls.

Once the liner is positioned within the pipeline, the liner is pressurized internally using a fluid pressure such as air or water to force the lining material into intimate contact with the pipe interior and provide compaction. Adding heat in the form of hot water, steam or electrical energy can then cure the resin matrix. The latter method of providing heat by electrical energy is disclosed in U.S. Pat. No. 5,606,997. Once the resin is cured, the resultant material forms a hard, tight fitting lining within the pipe that also serves to provide added structural support.

In the repair of sanitary sewer systems for instance, a main trunk line is used for the transportation of effluent from various intersecting piping systems to an end location. The majority of work to date has focused on the repair and rehabilitation of the main trunk lines. Even after much effort and expense has been expended on the remediation of these systems, the areas of confluence between the main lines and intersecting side lines (hereinafter called laterals) has only minimally been addressed. In a typical municipal sewer system, a plurality of laterals can exist in every mainline section. With as many as 10 laterals on a typical residential street, the potential for fluid ingress and egress at the lateral to main interface is great.

Only several processes are known that address repair of the lateral to main interface. One such process is described in U.S. Pat. No. 5,223,189 wherein a thermoplastic sealing bushing including an internal heating element is installed into the lateral opening from within the mainline by means of a robotic device and an expandable mandrel. This method relies on a heat formed seal being produced between the bushing and a pipeline lined with a similar, compatible thermoplastic material. In U.S. Pat. No. 5,950,682, a resin absorbent material, impregnated with a hardening resin matrix, is positioned within the mainline pipe and provides a means for inverting a section of like material into the lateral pipe for a pre-determined distance. Because these systems and, systems similar to this use a resin matrix that is expected to fully cross-link or cure in an undesirable environment (i.e. hot, cold, wet, etc), catalysts, initiators and even inhibitors are added to the resin system in an attempt to control the curing mechanism. This has resulted in many failures due to premature curing of the resin, inadequate resin cross-linking and shrinkage. In addition, because the resin is applied to the repair material at the installation site, inconsistencies in both resin content and mixing procedures can be expected. Other methods have been disclosed that use an auxiliary curing source unlike the typical systems that rely solely on ambient temperatures to effect a cure. Radiant energy in the form of ultraviolet light, as in U.S. Pat. No. 5,915,419, or visible light, as disclosed in U.S. Pat. No. 4,518,247 have been employed to provide a curing mechanism for lateral interface sealing systems. The shortcomings of these types of systems lay in the difficulty of the prescribed radiant light source to penetrate through the thickness of the repair material and the overall fragility of such devices.

Therefor, it is desirable to provide a system to overcome the constraints mentioned above and also afford a fast, consistent repair method that enables robust, cost effective reconstruction of the lateral to mainline interface.

Another problem is encountered with repairing pipes having large diameters. Various methods exist for rehabilitating damaged sanitary sewer conduits with diameters exceeding about eighteen inches. These methods include physical removal of the damaged section of the conduit, and replacement of the damaged section. A more common method is the use of a reinforced liner having dimensions similar to the dimensions of the damaged portion of the conduit.

Liners are typically formed from composite materials and can be impregnated on-site, or pre-impregnated with a curable resin. When the resin is cured, it hardens and the liner forms a protective shell in the section of the conduit where it is placed. There are two primary methods to cure the resin, ambient cure and heat activated cure, including hot water or steam cure.

Ambient curing suffers from a number of disadvantages. If the ambient temperature is too low, which is common with underground conduits, the resin will not completely cure and the liner can collapse. In contrast, if the ambient temperature is too high, the resin can cure prematurely, that is before the liner is properly located in the damaged portion of the conduit.

There are a number of disadvantages to curing a liner with hot water or steam. First, the equipment required to heat the water or to create steam is extremely expensive and inefficient. Second, curing with either fluid requires a temperature ramp-up, which consumes long periods of time. For example, the water temperature must be held at approximately 135° F. for several hours, and then increased to 180° F. for several more hours. For a ninety-six (96) inch conduit, the curing process can last between three to seven days.

Curing a liner with hot water, steam, or ambient is also negatively affected by heat sink in the conduit. The heat sink is greater on the lower portion of the conduit than on the upper portion of the conduit. This result occurs because the lower portion is typically wet, while the upper portion remains dry. This is especially true in a gravity conduit that is not fully charged. The wet lower portion of the conduit draws a greater amount of heat, q, from the heat source than does the dry upper portion. The heat flux, q", in the lower portion of the conduit is greater than the heat flux in the upper portion of the conduit. As a result, a greater quantity of heat is required to cure liner in the lower segments of the conduit than liner in the upper segments of the conduit. In addition, heat sink can prevent the complete curing of all resin in the liner, thereby reducing the strength and durability of the liner. These factors reduce both the cost efficiency and process efficiency of hot water, steam, and ambient cure.

The conventional liners used to repair large diameter conduits are very thick and generally require a large amount of resin. The large amount of resin exacerbates the need for ramped temperatures and as a result, further increases curing times while reducing the efficiency of the repair. Due to their large size and weight, liners for large diameter conduits are difficult to handle and maneuver within the damaged conduit. Also, liners for large diameter conduits are more susceptible to the negative effects of heat sink.

One aspect of the present invention is provided to solve these and other problems.

SUMMARY OF THE INVENTION

In one embodiment the present invention is directed to an apparatus for repairing an intersection between a first conduit and a second conduit. The apparatus comprises a body or support structure for transporting repair material containing a heat curable resin to the intersection of the first conduit and the second conduit. The repair material is structured to conform to the shape of the intersection. The body includes an inflation device that is connected to and carried by the body. The inflation device is capable of compressing the repair material to at least a portion of the intersection. For example, the inflation device may be a tubular inflatable bladder that compresses a portion of the repair material against the interior of the second conduit adjacent the intersection. The inflation device includes conductive fibers capable of electrically resistively heating the inflation device to effect curing of the resin in the repair material. These fibers could be metallic or may be of a non-ferrous material.

The apparatus may further comprise a first caul plate, or wing structure connected to the body. The first caul plate is moveable from a retracted position (which facilitates movement of the body through the first conduit) to an extended position to compress a portion of the repair material against the first conduit to form a flange proximate the intersection. A second similar caul plate can also be connected to the body. The caul plates may include conductive fibers capable of electrically resistively heating the caul plates to facilitate curing of the flange portion of the repair material.

The apparatus may further comprise skid plates connected to the body to assist in positioning the apparatus at the proper location in the first conduit. Additionally, the body of the apparatus may further include a lift mechanism, for example, a lift cylinder, to facilitate positioning of the repair material against the intersection.

In a separate embodiment, the invention comprises an apparatus for repairing an intersection of a first conduit and a second conduit having a support structure for transporting and positioning a repair material impregnated with a heat curable resin at the intersection of the first conduit and the second conduit. The support structure houses an inflatable bladder having a plurality of conductive fibers for electrically generating resistive heat to facilitate curing of the resin impregnated in the material.

The apparatus further includes a first line connected to the support structure for providing fluid pressure, from a source of fluid pressure, to inflate the bladder, and a second line connected to the support structure for providing electrical energy, from a power source, to the conductive fibers in said bladder.

The apparatus may further comprise a wing formation connected to said support structure to compress a flange portion of the repair material at said intersection. The wing structure preferable includes conductive fibers for electrically generating resistive heat to facilitate curing of the flange portion of the repair material. The apparatus may further include a lift mechanism to facilitate positioning of the repair material at the intersection.

In another embodiment of the invention a method of repairing an intersection of a first conduit and a second conduit is disclosed. The method comprises providing a repair material configured to conform to an intersection of a first conduit and a second conduit, impregnating the repair material with a heat curable resin, positioning said repair material at the intersection, compressing the repair material against the intersection with a structure having a plurality of electrically conductive fibers, and applying an electric current to the conductive fibers to resistively heat the fibers to facilitate curing of the resin in the repair material.

The method may further include providing an inflatable bladder for compressing the repair material against the intersection, and inflating the bladder. Additionally, the method may further comprise forming a flange in the repair material, and compressing the flange against a portion of said first conduit proximate the intersection.

The interface or intersection sealing apparatus of the present invention allows for a structural, pre-impregnated, flanged composite repair collar to be efficiently positioned and cured in place. The cured composite to provide the restoration of the connection between a main line conduit and an intersecting line. The apparatus is equipped with an inflation/heating device, which is capable of inverting the repair material into the lateral line, and an articulated, heated caul plate that firmly compresses the flanged portion of the material within the mainline. The integral heating system comprises two differentially controlled heating assemblies containing an array of electrically conductive fiber heating elements embedded in both constructions to generate heat for cure. The device further provides a launching platform to safely transport and position the repair material and house the electro-pneumatic and electrical components for the separate operation of the inflatable components and the mechanical motion components. The repair materials used are all pre-impregnated off-site in a controlled environment, heat activated and stable at ambient temperatures therefore eliminating premature cross-linking of the resin matrix before the repair is satisfactorily positioned, and ensuring thorough and consistent resin wet-out. Because of the localized concentration of applied heat, cure cycles can be as fast as 15 minutes, depending on resin systems used, without disturbing surrounding areas.

According to an object of another embodiment of the invention, a liner is provided for repairing damage in large diameter conduits. The liner comprises a plurality of discrete heating zones and a plurality of interface areas. Each heating zone is impregnated with a heat curable resin. Each zone has a fiber architecture formed from the combination of a plurality of conductive fibers and non-conductive fibers. Preferably, the conductive fibers are carbon fibers, which also give the fiber architecture high strength qualities.

Each interface area is located between a pair of heating zones, and each area is impregnated with a heat curable resin. Each interface area has a fiber architecture formed from a plurality of non-conductive fibers. The ends of two heating zones abut at a seam within each interface area.

The liner further includes a hybrid tape that is placed about the interface area and the heating zones. The hybrid tape helps to prevent fracture or rupture of the seam. The hybrid tape is formed from the consolidation of two outer layers formed from non-conductive fibers and an inner layer formed from conductive fibers. The hybrid tape can be used to cure the resin in the interface area.

Another object of this invention is a method of applying current via leads to the heating zones in the liner to cure the resin impregnated therein. Current can be applied to individual heating zones, or in a sequential manner to heating zones to effectuate a precisely controlled and efficient cure cycle. Alternatively, current can be applied to the heating zones and the hybrid tape to cure the resin.

In a further embodiment, the in-situ repair of a conduit can be effectuated by a fiber reinforced thermoplastic ("FRP") composite pipe with multiple layers. According to an aspect of the invention, the composite pipe results when the discrete layers in multi-component pipe are heat formed and consolidated. The multi-component pipe comprises an inner layer of thermoplastic resin, where the inner layer is formed from an extrusion process. An outer layer of thermoplastic resin, where the outer layer is formed from an extrusion process. An intermediate layer having a fiber architecture, where the fiber architecture is formed from winding a plurality of conductive fibers. The conductive fibers are preferably carbon fibers. The fiber architecture includes a plurality of non-conductive fibers. The conductive fibers and the non-conductive fibers are commingled with a plurality of thermoplastic filaments.

According to another aspect of the invention, the multi-component pipe comprises an inner layer of thermoplastic resin, where the inner layer is formed from an extrusion process. An outer layer of thermoplastic resin, where the outer layer is formed from an extrusion process. An intermediate layer formed from conductive tape, where the conductive tape has a plurality of conductive fibers. The conductive tape can be wrapped, woven, stitch-bonded, or needle-punched about an outer surface of the inner layer. The intermediate layer can include a plurality of thermoplastic fibers. The intermediate layer can include a plurality of non-conductive fibers, the non-conductive fibers commingled with plurality of thermoplastic filaments.

According to another aspect of the invention, a method of repairing a damaged conduit with a composite pipe comprises extruding thermoplastic resin to form an inner layer of a pipe; winding a plurality of conductive fibers to form an intermediate layer, the intermediate layer positioned about the inner layer; and, extruding thermoplastic resin to form an outer layer, the outer layer positioned about the intermediate layer to form a flexible multi-component pipe. Additionally, the method includes applying pressure to deform the multi-component pipe; spooling the multi-component pipe onto a storage coil; dispensing the multi-component pipe from the storage coil into a damaged conduit, the conduit having internal dimensions; applying fluid pressure to the multi-component pipe to reshape the multi-component pipe; applying current to the conductive fibers in the multi-component pipe to heat form and consolidate the inner, intermediate, and outer layers into a composite pipe; and, applying additional fluid pressure to further reshape the composite pipe to correspond to the internal dimensions of the conduit. The method further comprises the step of connecting electric leads to a power source and the conductive fibers in the composite pipe.

Further aspects of the invention are disclosed in the detailed description of the preferred embodiment, the drawings and the claims.

BRIEF DESCRIPTION OF THE DRAWINGS

Embodiments of the invention will be described with the aid of the following diagrammatic drawings.

FIG. 13 is a cross-sectional view of a multi-component pipe, showing a plurality of commingled conductive fibers and non-conductive fibers;

FIG. 15 is a schematic diagram of the process used to form the composite pipe of FIG. 12;

FIG. 16 is end view of an alternate embodiment showing a flexible multi-component pipe; and, FIG. 17 is a partial cross-sectional view of an alternate embodiment showing a multi-component pipe.

DETAILED DESCRIPTION OF THE PREFERRED EMBODIMENT

Figure 1:
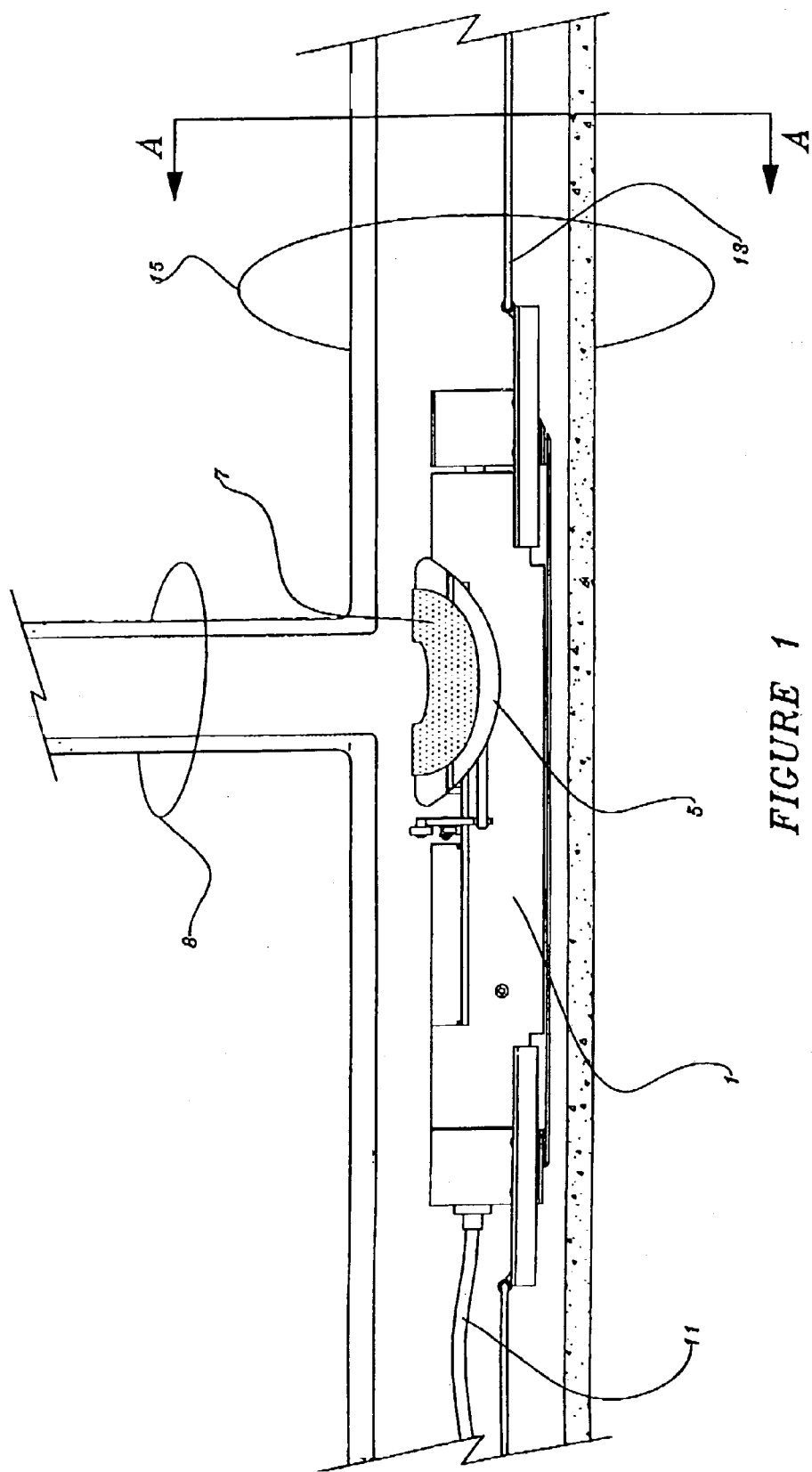
FIG. 1 is a side view of the apparatus of the present invention in a main line adjacent to an intersecting lateral line.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Conduit Intersection Repair:

A preferred embodiment of the apparatus of the present invention is depicted in FIG. 1. In accordance with the invention, the apparatus includes a main body 1 that is positioned in a first conduit 15. The first conduit 15 may be pipe forming a main line of a sewer system. The main line 15 intersects a second conduit or lateral line 8. Lateral line 8 is shown here in a perpendicular position essentially at a 90° angle to the main line pipe and intersects the main line pipe at the top portion. This condition is typical but may also be arranged in other configurations. For example, the lateral pipe may intersect the main line pipe at ±45° and can be located radially anywhere from the nine o'clock position to the three o'clock position.

Repair material 7 is loaded into the apparatus in preparation for insertion at the intersection of the main line and lateral line. Repair material 7 is preferably constructed of a reinforcing material capable of holding a heat hardenable or formable resin matrix. Material 7 is also constructed of a material that would be expected to include a portion 7a that conforms to the interior geometry of the lateral pipe wall, and be flexible enough to provide a flange face 7b in the main line pipe.

Radial and vertical positioning of the apparatus is achieved remotely using appropriate controls, and communicated to the apparatus through an umbilical 11. The entire assembly is delivered to the point of repair using a winch or similar device attached the unit via cable assemblies 13.

Figure 2:
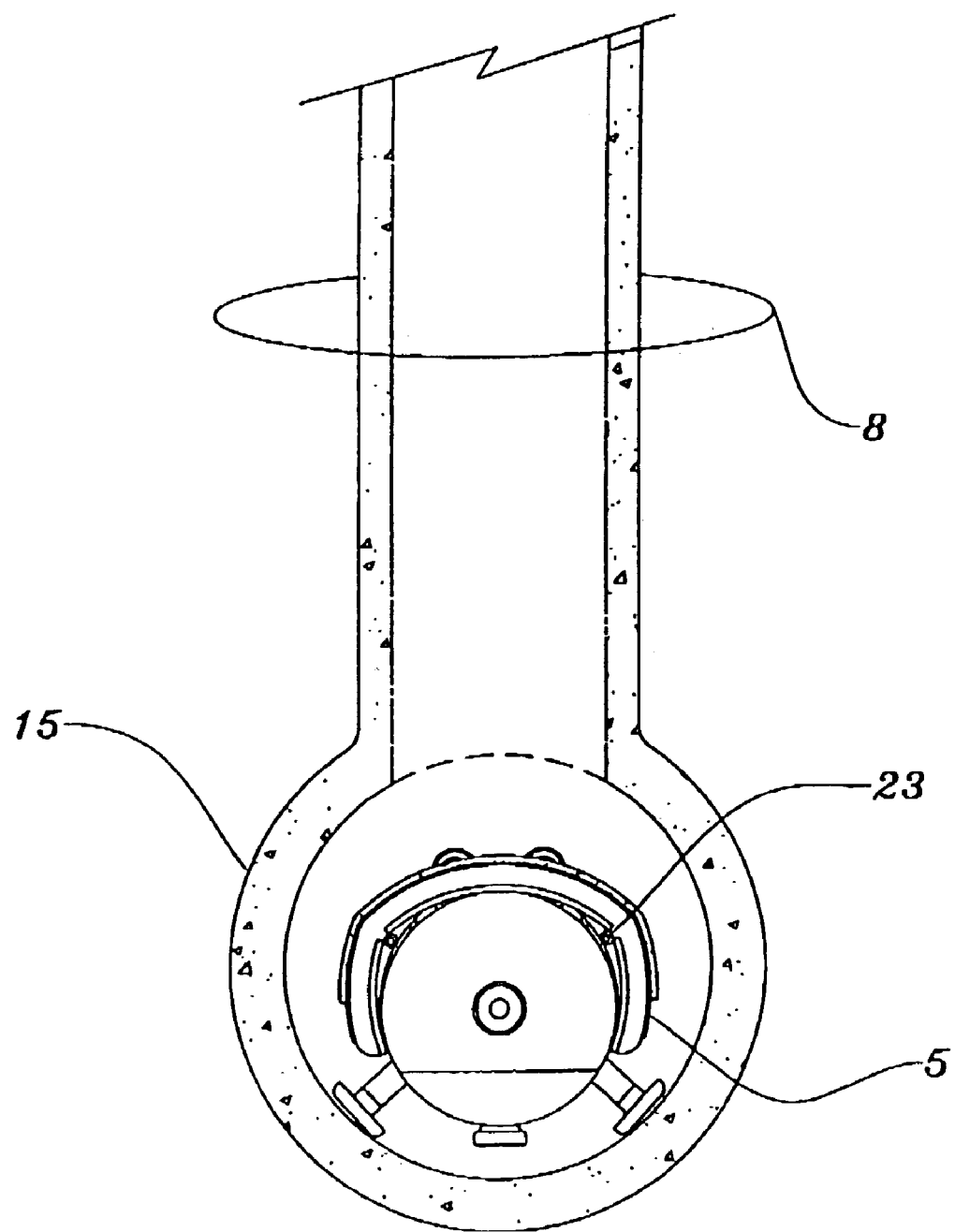
FIG. 2 is an end view of the apparatus of FIG. 1.

In FIG. 2, the apparatus is shown again in a typical condition. Heated caul plates 5 are shown in a retracted position on an upper portion of the body 1 of the apparatus, affording a minimal cross section and allowing passage into a main line that may contain offsets, protrusions, etc. The caul plates 5 (herein after referred to as "wings") are articulated to allow this reduced cross section by the use of hinges 23.

Figure 7:
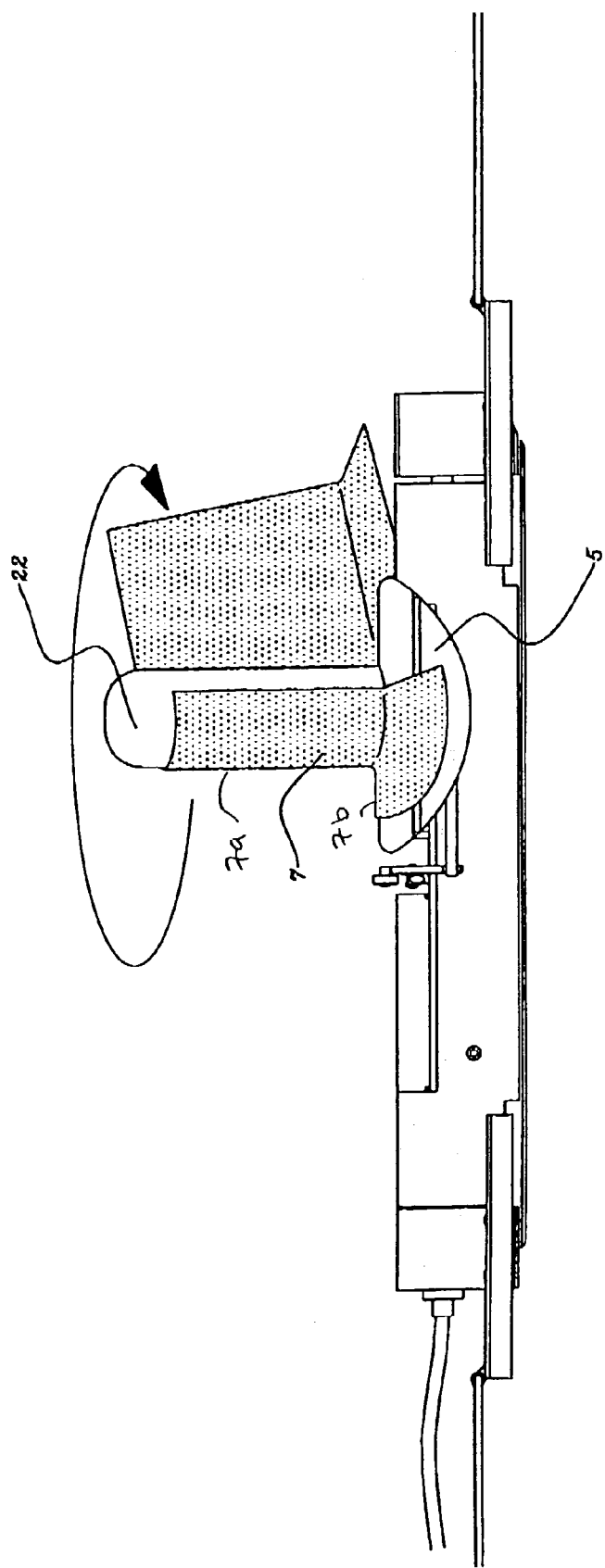
FIG. 7 is a side view of the apparatus of the present invention demonstrating the repair material loading process.
Figure 8:
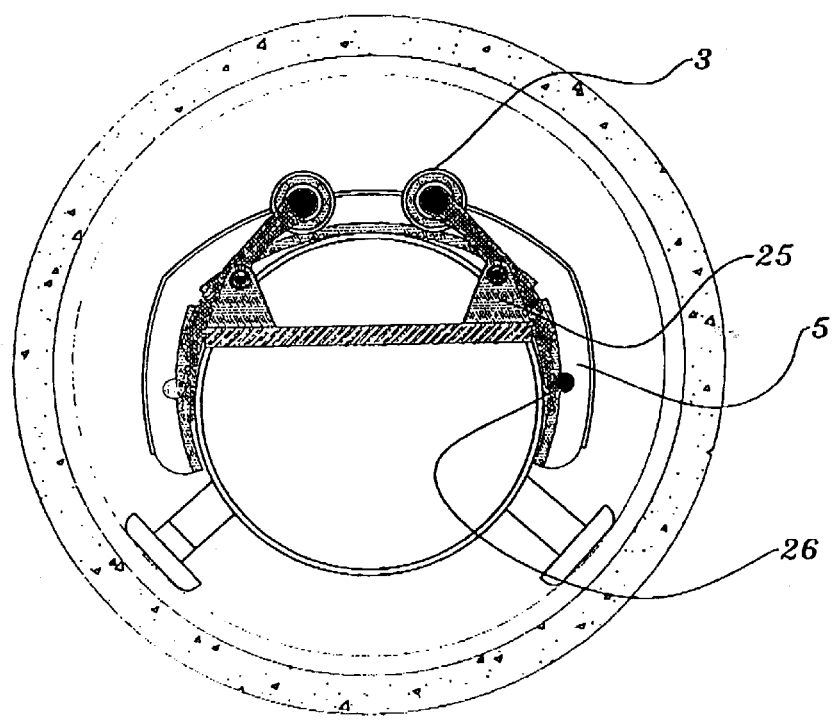
FIG. 8 is a simplified, cross-sectional end view; enlarged to illustrate the actuator arm assembly of the apparatus.

In FIG. 7, the method for loading the repair material 7 is illustrated. Applying a fluid pressure to the body 1 through umbilical 11 pressurizes an inflation device in the form of a bladder 22. This fluid pressure is regulated through the use of electro-pneumatic regulators located in rear housing 6 in the body 1, and controlled remotely through signal wires in umbilical 11. Pressure sensing is accomplished by sending units located within main body 1 and transmitted through umbilical 11. All of the signal wires in umbilical 11 terminate at an operator interface control station. The force required during this step in minimal and sufficient to cause the bladder 22 to rigidize.

Figure 3:
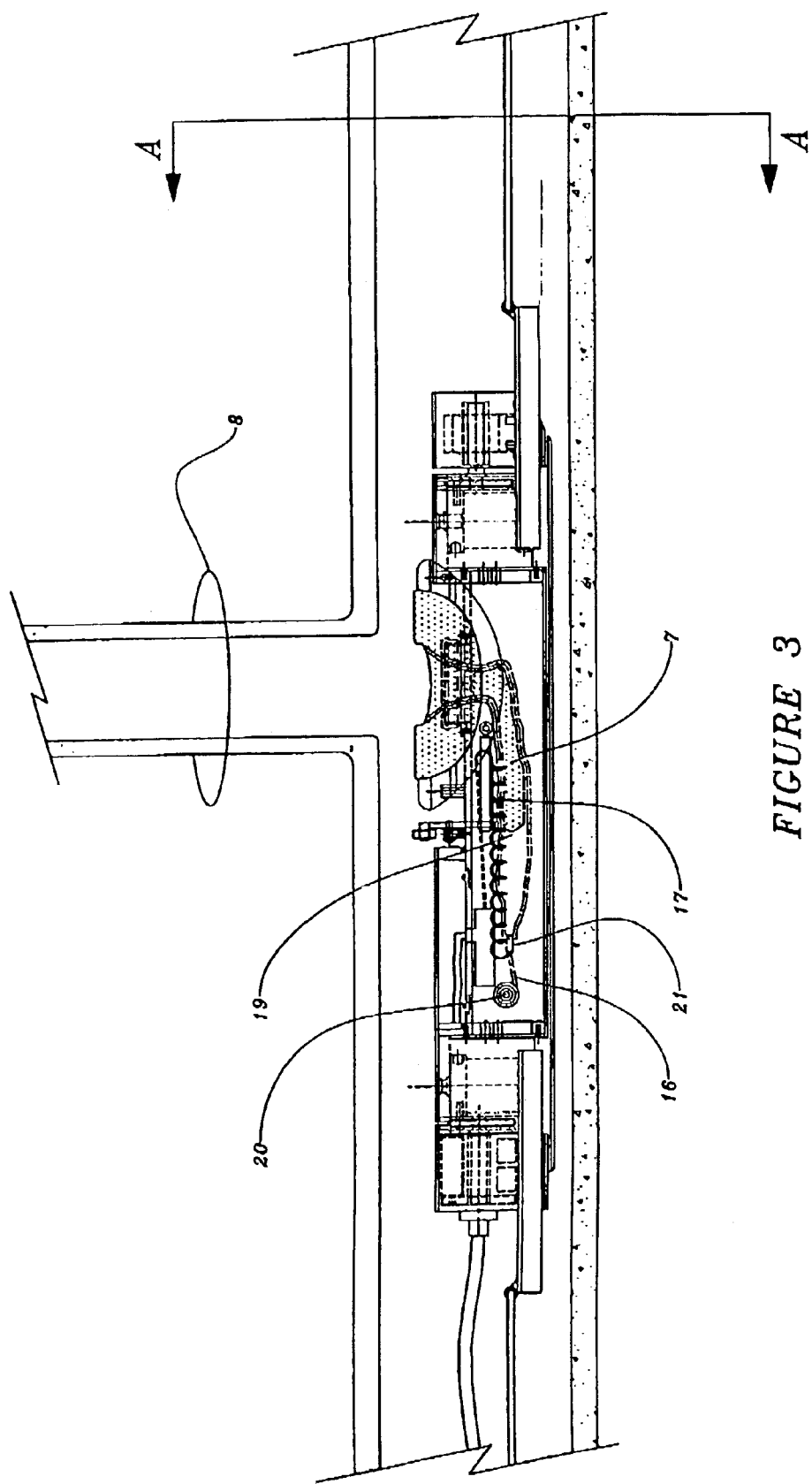
FIG. 3 is a partial cross-sectional side view of the apparatus of the present invention detailing the internal workings of the apparatus.
Figure 4:
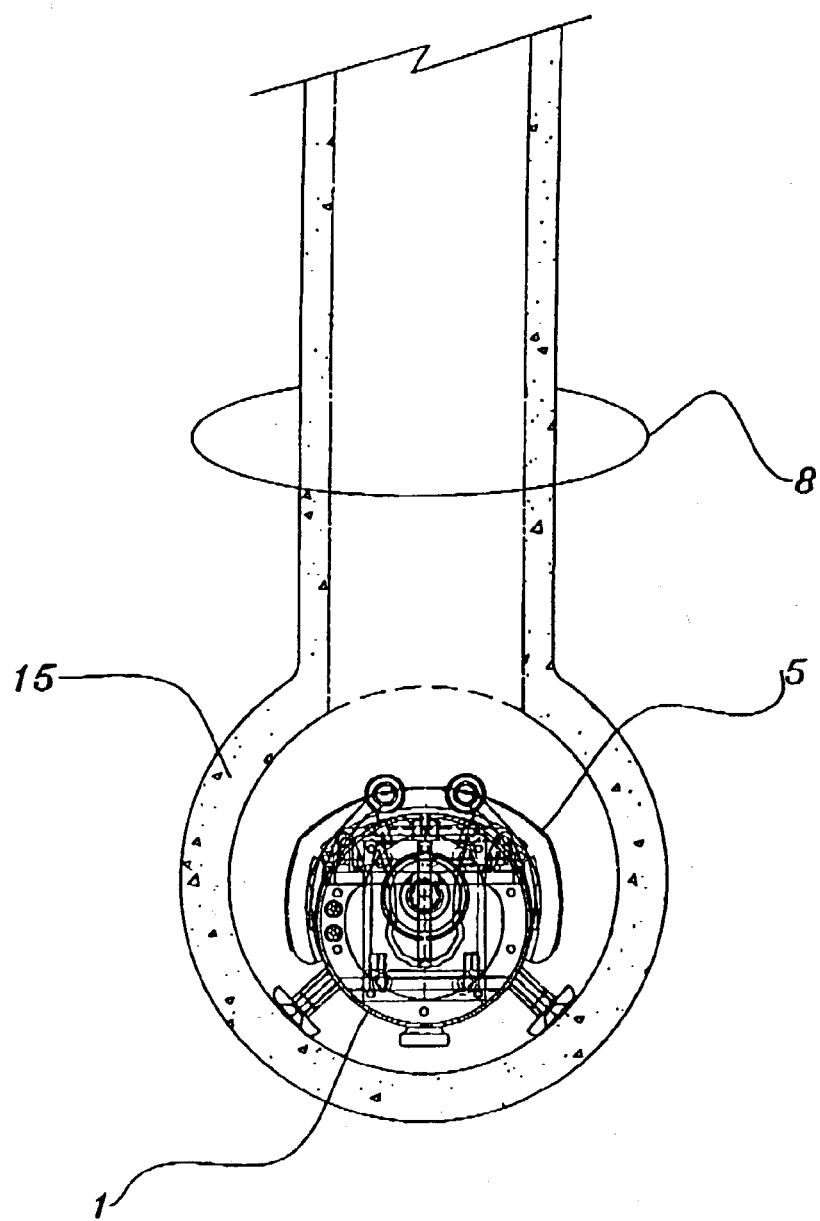
FIG. 4 is a cross-sectional end view of the apparatus.

The repair material 7 is constructed in such a fashion as to incorporate both the tubular lateral lining portion 7a as well as the flanged area 7b without the undesirable effect of a potentially weak seam at the transition from tubular to planar. With the bladder 22 pressurized, the material 7, pre-impregnated with a resin, is wrapped around the extended bladder 22 and caused to lay flat on the surface of the wings 5. Depending on the structural requirements, layers of material 7 can continue to be plied to achieve the desired strengths. With the lay-up complete, the internal pressure inside the bladder 22 is lowered to facilitate inversion into the main body 1 of the apparatus. As shown in FIG. 3, a spindle 20 capable of rotation is fixably attached within the body 1 at a posterior location. The spindle is sealed from the atmosphere by the use of o-rings and protrudes slightly from the body 1 to allow attachment of a tool to cause rotation.

Figure 5:
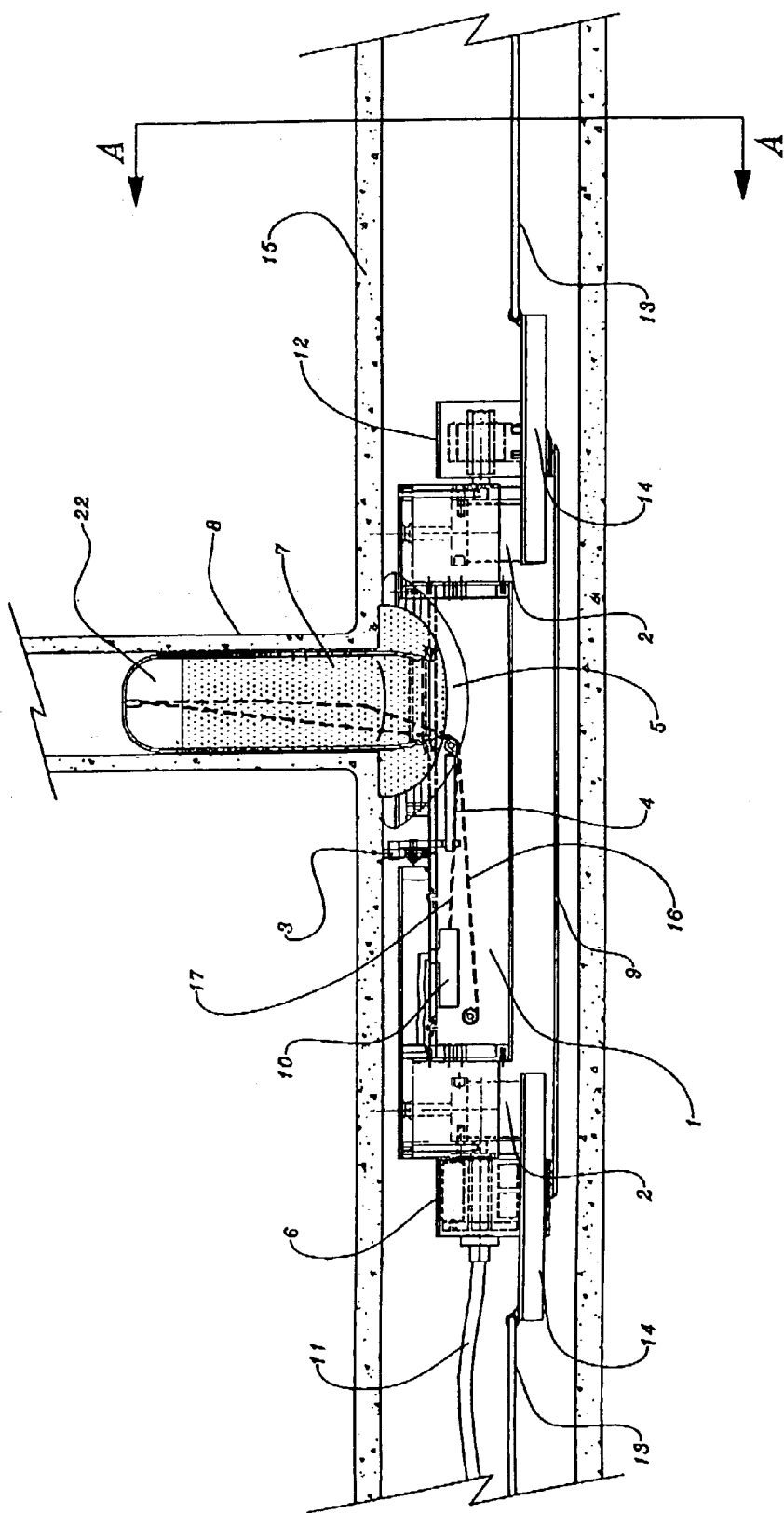
FIG. 5 is a side view depicting the apparatus with the carriage extended and inflation bladder inverted into a lateral line.

As shown is FIG. 5, the bladder construction contains an internal tether 16 that is permanently attached to the interior of the bladder at fitting 21 and removably attached to spindle 20 within the main body 1. To invert the bladder 22 and repair material 7 into the main body for safe transport to the repair location, the tether is wound about the spindle causing the bladder to retract. With the repair material loaded into the device, a winch, or similar device is employed to pull the apparatus to the desired location within a pipeline. A closed circuit television camera (not shown) can be used to assist in determining the correct location and positioning. Once the entire assembly has been satisfactorily located in proximity to the repair area, final positioning commences via remote control.

FIG. 5 shows the internal workings of the apparatus. In order to facilitate rotary positioning, the apparatus contains a powered rotational mechanism located in rear housing 6. The rotation mechanism is attached to the main body 1 by use of a coupling. The front section 12 of the body 1 contains a rotary bearing to compliment this action. Skids 14 are attached to both the front 12 and rear 6 sections to afford minimal surface contact with the main line pipe and ease pulling forces required.

Figure 6:
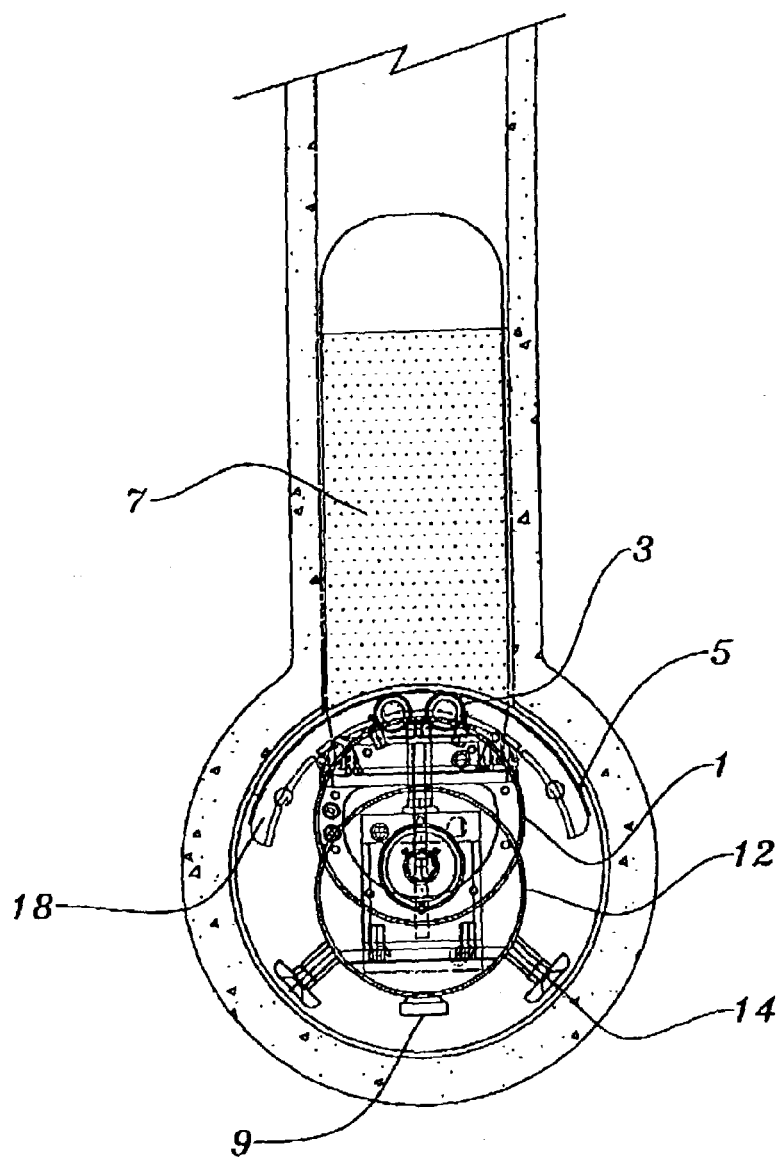
FIG. 6 shows an enlarged end view of the apparatus of FIG. 5 placing the repair material in an intersecting lateral line.

With the device appropriately positioned radially, vertical lift is accomplished using lift cylinders 2. The lift cylinders can be actuated with compressed air or hydraulically using a suitable medium. These cylinders are firmly attached to front section 12 and rear section 6 with the cylinder rams attached to the main body 1. When activated, the cylinders effectively lift the main body to force the top portion of the caul plate to be in contact with the interior wall of the main line pipe at the area surrounding the lateral pipe opening. As the main body lifts, actuator arms 3 encounter the main line pipe wall, as depicted in FIG. 6. In FIG. 7, the actuator arm bearings 3 convert the vertical motion to a lifting motion through a fulcrum 25 attached to the main body 1. The opposite ends of the actuator arms 26 are positioned under the wings 5 and cause the wings to unfold and compress the flanged area 7b of the repair material 7 firmly against the main line pipe walls.

By introducing pressure to the interior of the main body 1 through umbilical 11, the bladder 22 and repair material 7 is caused to invert into the lateral pipe 8. Increasing the pressure inside the bladder causes the tubular section of the repair material to conform to the inside geometry of the lateral pipe section.

The bladder 22 and the caul plates 5, are constructed of a temperature resistant material and contain within the outer skin surface, electrically conductive fibers that are employed to produce heat when an electrical current passes through the fibers. The material surrounding the conductive fibers is a flexible, resilient substance such as silicone, fluorosilicone or fluoropolymer. Electrical wires 17 conduct the electrical energy from remotely stationed, controllable power supplies to the electrically conductive fibers. Heating temperatures produced range from 200° F.–400° F. depending on the curing requirements of the resin matrix selected for use in the repair material 7. These temperatures can be achieved in as little as 10 minutes enabling an extremely fast cure cycle.

The bladder 22 is detachable from the main body to facilitate replacement or to switch to a bladder of different length and/or diameter. When the desired temperatures have been achieved and cure cycle complete, the apparatus can be removed from the pipeline and loaded again with repair material for an additional repair. With the ability to quickly produce and control heat, multiple repair installations are completed in a short time frame.

To remove the apparatus from the pipeline, steps include first removing electrical power from the conductive fibers in both the bladder and caul pads. Next, the pressurized interior of the main body 1 and bladder 22 is introduced to vacuum. A venturi type vacuum pump 10, which produces vacuum from a pressurized air supply, is housed within the main body 1. Electro-pneumatic solenoid valves located in the rear section 6 switch the supply of pressurized air delivered by umbilical 11 from the interior of the main body and redirect this air supply to the venturi vacuum. This application of vacuum quickly and completely evacuates all air from within the bladder 22 and causes the bladder 22 to collapse on itself, releasing contact from the completed repair material and the interior surfaces of the lateral pipe. Continued application of vacuum also causes the bladder 22 to retract back into the main body.

Lift cylinders 2 are double acting in that the fluid pressure applied to cause lift can be switched to cause the cylinder rams to retract. This switching is also accomplished through the use of electro-pneumatic valves located in rear housing 6. As the cylinders retract and lower the main body, the actuator arm bearings 3 are removed from contact with the main line pipe wall. Torsion springs located both in the actuator arm fulcrum blocks 25 and the wing hinges 26 cause the wings to retract to the original folded position. This ensures that the entire device again assumes a smaller cross section allowing egress from the main line pipe.

Figure 9:
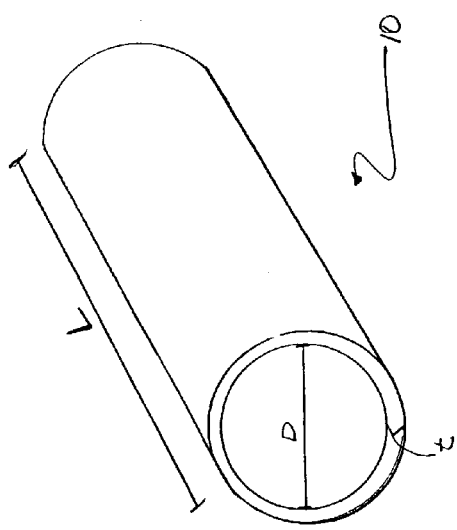
FIG. 9 is a perspective view of a liner according to the invention.

Large Diameter Pipe Liner:

FIG. 9 shows a liner 110 for repairing damage in large diameter conduits, typically those with a diameter exceeding about eighteen (18) inches. The liner 110 is formed to be generally cylindrical or tubular. Once formed, the liner 110 has a length L, a diameter D, and a thickness, t.

Figure 10:
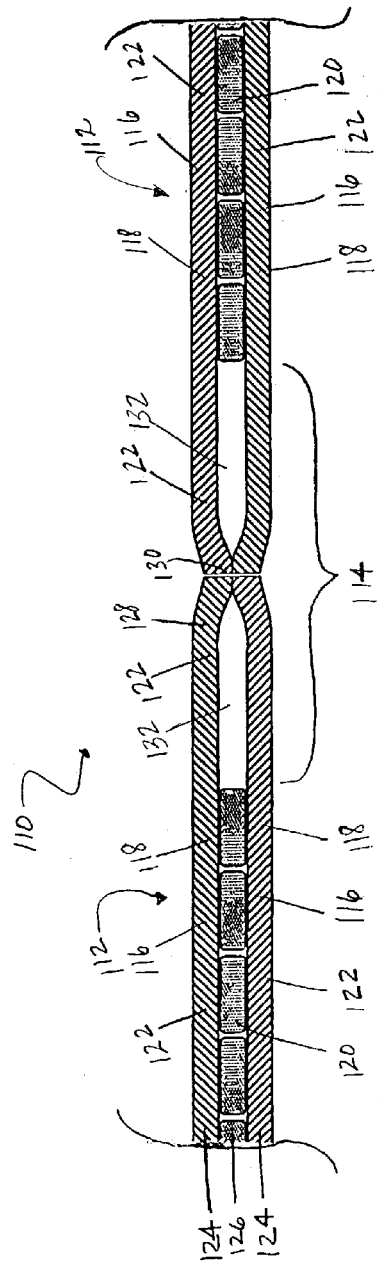
FIG. 10 is a partial cross-sectional view of the liner of FIG. 9, showing a plurality of heating zones and an interface area.

In FIG. 10, a partial cross-section of the liner 110 is shown. There, the liner 110 comprises a plurality of discrete heating zones 112 and a plurality of interface areas 114. Each heating zone 112 extends lengthwise through the liner 110, and each zone 112 a circumferential dimension. Each heating zone 112 is impregnated with a curable resin 116, and has a fiber architecture 118. The resin 116 can be of the thermoset or thermoplastic variety. The fiber architecture 118 or fiber structure of the heating zones 112 is formed from the combination of a plurality of electrically conductive fibers 120 and a plurality of non-conductive fibers 122. Alternatively, the fiber architecture 118 of the heating zones 112 can be formed from only conductive fibers 120.

Preferably, the conductive fibers 120 are carbon fibers because they provide great strength to the liner 110; however, other conductive fibers are feasible. The non-conductive fibers 122 are synthetic fibers, such as polyester, polyethylene, nylon, or fiberglass. Glass fibers can also be used in combination with carbon and polyester fibers.

A number of different mechanical consolidation techniques can be used to form the fiber architecture 118 of the liner 110. These consolidation techniques include weaving, needling (needle punching), or stitch-bonding the conductive fibers 120 and non-conductive fibers 122. In addition to mechanical consolidation, the fiber architecture 118 can be formed by chemically consolidating the fibers 120, 122 under vacuum pressure. With any of these consolidation techniques, the filaments of conductive fibers 120 and non-conductive fibers 122 are combined to form the fiber architecture 118.

As shown in FIG. 10, once the consolidation technique is completed, the liner 110 has an fiber architecture 118 with a pair of outer layers 124 of predominantly non-conductive fiber 122 and an inner layer 126 of predominantly conductive fibers 120. Described in a different manner, the two layers 124 of non-conductive fibers 122 surround, or envelop the layer 126 of conductive fibers 120. Regardless of the consolidation technique, curable resin 116 permeates the outer layers 124.

Electric leads can be connected to each of the discrete heating zones 112 such that current can be applied to the heating zones 112 via the leads to cure the resin 116. Specifically, current can be applied in a controlled, sequential manner through the leads to the conductive fibers 120 in each of the heating zones 112 to heat and cure the resin 116. Because the current can be applied in a controlled manner, the cure cycle of the resin 116 can be closely and efficiently monitored.

The interface area 114 is a portion of the liner 110 which is located between a pair of heating zones 112. Each interface area 114 extends lengthwise through the liner 110, and each interface area 114 has a circumferential dimension. Like the heating zones 112, the interface area 114 is impregnated with a curable resin 116, and has a fiber architecture 128. The resin 116 in the interface area 114 is similar to the resin in the heating zones 112. The fiber architecture 128 or fiber structure of the interface area 114 is formed from a plurality of non-conductive fibers 122. Preferably, no conductive fibers 120 are used to form the interface area 114. The non-conductive fibers 122 are synthetic fibers, such as polyester, polyethylene, nylon, or fiberglass. Glass fibers can also be used in combination with polyester fibers.

The fiber architecture 128 of the interface area 114 can be formed from any of the mechanical or chemical consolidation techniques described above. With any of these consolidation techniques, the fiber architecture 128 does not include conductive fibers.

As shown in FIG. 10, the interface area 114 is characterized by the tapering of the liner 110. Two portions of the heating zone 112 taper to meet at a seam 130 in the interface area 114. At the seam or border 130, two opposing end portions of the heating zone 110 are joined together. The seam 130 can be formed by needle-punching or stitch-bonding. Since the liner 110 tapers, a dielectric cavity 132 is formed in the interface area 114 on each side of the seam 130. Because the fiber architecture 128 of interface area 114 does not include conductive fibers, the cavity 132 represents an absence of conductive fibers. The size and shape of the cavity 132 can vary depending upon the configuration of the seam 130 and the technique used to form the seam 130.

The number and dimensions of the discrete heating zones 112 can vary with the size of the conduit needing repair. For example, a liner 110 for use in repairing a twenty-four (24) inch diameter conduit can have between two to four heating zones 112, depending on the dimensions of the zones 112. The zones 112 are spaced apart and disposed circumferentially throughout the liner 110. If the circumferential dimensions of the heating zones 112 are relatively large, then the liner 110 will have less zones 112. Conversely, if the circumferential dimensions of the zones 112 are relatively small, then the liner 110 will have more zones 112. The liner 110 is suitable for use in repairing conduits with diameters up to and including one-hundred and eight (108) inches.

Similarly, the number and dimensions of the interface areas 114 can vary with the size of the liner 110 used to repair a conduit. Generally, the interface area 114 should be integral and continuous, meaning that it spans the entire length L of the liner 110. Preferably, the circumferential distance of the interface area 114 should be at least two (2) inches; however, that dimension can vary with the size of the liner 110 and the diameter of the conduit needing repair. If the interface area 114 is not properly formed or maintained, electric current can arc from one heating zone to an adjacent heating zone. Typically, the arcing is uncontrollable and negatively affects the resin cure cycle.

Figure 11:
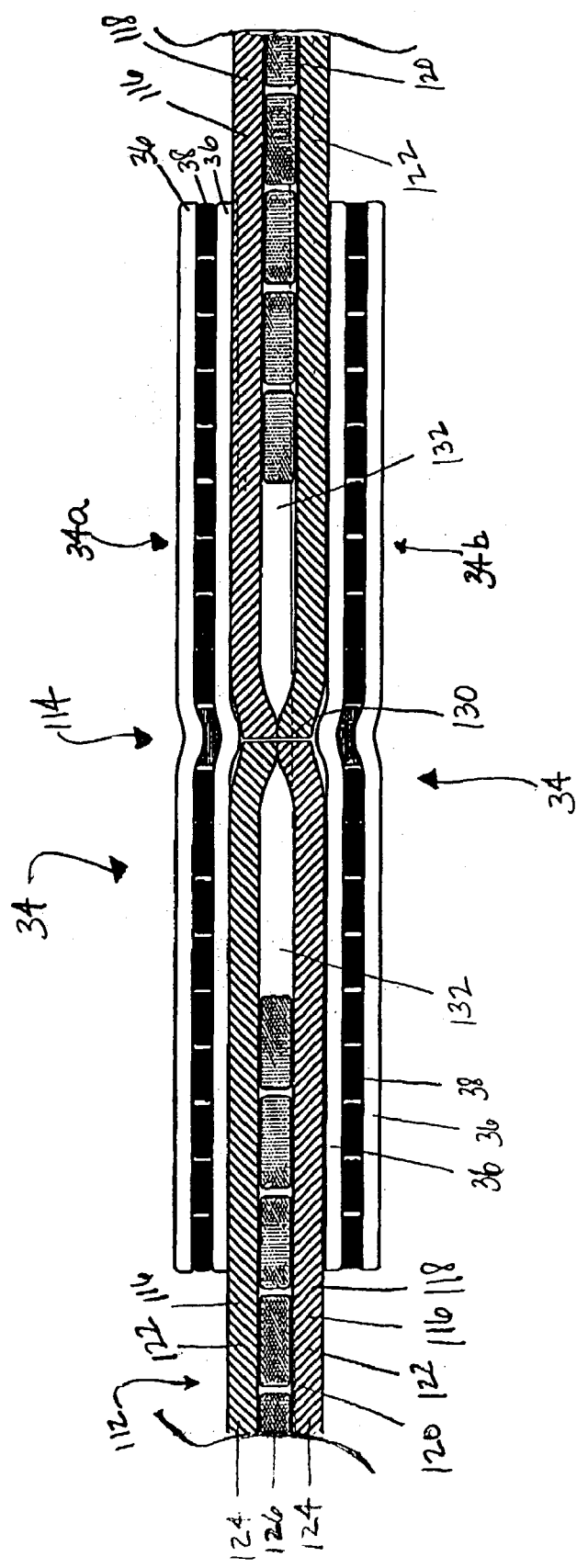
FIG. 11 is a partial cross-sectional view of the liner of FIG. 9 showing a hybrid tape overlapping the interface area and a portion of the heating zones.

The liner 110 further includes a means for sealing the interface areas 114 and the heating zones 112. This is accomplished by applying a tape over a portion of the interface area 114 and the heating zones 112. Referring to FIG. 11, the preferred sealing means is a hybrid tape 134 placed about the interface area 114 to ensure the structural integrity of the interface area 114 and the seam 130. The hybrid tape 134 is preferably formed from the combination of layers of non-conductive fibers 136 and conductive fibers 138. The non-conductive fibers 136 can be synthetic fibers, such as polyester, polyethylene, nylon, or fiberglass. The conductive fibers 138 are carbon fibers, which increase the strength of the hybrid tape 134 and prevent failure of the seam 130.

The hybrid tape 134 is flame laminated, or fused (calendared) to a portion of the interface area 114 and the heating zone 112. Alternatively, the hybrid tape can be resistively heated under pressure by passing a current through it to secure it in the appropriate location.

As shown in FIG. 11, two separate segments of hybrid tape 134 are used to seal the interface area 114 and seam 130. A first hybrid tape 134a is positioned in close proximity to an upper surface of the liner 110, and a second hybrid tape 134b is positioned in close proximity to a lower surface of the liner 110. Once the tapes 134a, 134b are properly positioned, the tapes can be joined to the interface area 114 and heating zones 112 in either of the manners discussed above. Although two distinct hybrid tapes 134a, 134b are shown, a single hybrid tape 134 of sufficient size and strength can be used to seal the interface area 114 and the zones 112.

The hybrid tape 134 can be configured to overlap the interface area 114 and a portion of the adjacent heating zones 112, or it can be configured to cover only the interface area 114. In either configuration, the hybrid tape 134 can prevent rupture or failure of the seam 130.

Electric leads can be connected to each of the hybrid tape 134 such that current can be applied to the hybrid tape 134 to cure the resin 116 in the interface areas 114. Specifically, current can be applied in a controlled, sequential manner through the lead to the conductive fibers 138 in each of the hybrid tape 134 to heat and cure the resin 116 in the interface area 114. Since the current can be applied in a controlled manner, the cure cycle of the resin 116 can be closely and efficiently monitored.

Alternatively, when leads are not used to apply current directly to the hybrid tape 134, the resin 116 in the interface area 114 can be cured from the heat generated in and transferred from the conductive fibers 120 in the adjacent heating zones 112.

The present invention also provides a method for repairing large diameter conduits with a liner 110 generally having a plurality of heating zones 112 and interfaces areas 114, which permit controlled and location specific application of current to cure resin 116 in the liner 110.

The method involves the following steps. Providing a liner 110 having a plurality of heating zones 112, where each zone is impregnated with a curable resin 116. Each zone 112 has a fiber architecture 118 formed from the combination of conductive fibers 120 and non-conductive 122. The liner 110 further having a plurality of interface areas 114 where each interface area 114 is located between a pair of zones 112. Each interface area 114 is impregnated with a curable resin 116, and each interface area 114 has a fiber architecture 128 formed from a plurality of non-conductive fibers 122. The liner further having a means for sealing the interface areas 114 and portions of the zones 112. The sealing means is preferably a hybrid tape 134 which is secured to the liner 110 proximate the interface area 114 and portions of adjacent zones 112 to ensure the integrity of the seam 130 in the interface area 114.

Electric leads can be connected to each of the zones 114, or a combination of zones 114. Also, electric leads can be connected to each of the hybrid tapes 134, or a combination of tapes 134.

Once the damaged section of the conduit is properly evaluated, the liner 110 is placed within the damaged portion of the conduit. Next, current is supplied to various heating zones 112 in the liner 110 via the leads. Depending upon the configuration of the leads, current can be applied to a single heating zone 112 or to multiple heating zones 112. The current is used to cure the resin 116 in the heating zones 112 and in the interface areas 114 through resistive heating. The order of current application can be varied such that current is applied sequentially to each of the heating zones 112. After the resin 116 in the liner 110 is cured, the electric leads can be removed from their connection point.

Once the liner 110 is positioned near the damaged portion of the conduit, an inflatable bladder can be used to press the liner 110 against the inner surface of the conduit. A power source is activated to generate a sufficient electric current through the leads and the liner 110 to resistively heat the liner 110 and cure the heat activated resin 116. It has been found that 0.5–1.0 amps per bundle of conductive fibers 120 is sufficient to cure the resin 116. Alternatively, using 5 volts per foot (lengthwise) of the liner 110 is suitable to cure the resin 116.

The current travels from a first lead to a first end of the lining 110, and longitudinally down the lining 110 through the conductive fibers 120 to a second end of the lining 110. The current then travels longitudinally from the second end of the lining 110 to the first end of the lining 110 through the conductive fibers connected to a second lead. The current then travels through the second lead to the power source to complete the circuit.

The custom curing of resin in various zones 112 negates the problems of heat sink, which is very common in large diameter conduit. When heat sink occurs in large diameter conduits, the curing cycle times for various portions of the liner can increase dramatically. When the curing cycle times increase, the operating and labor costs increase and the efficiency of the curing cycle is decreased.

The customized current application method described above reduces the curing cycle time and provides a high degree of control over the resin 116 because current can be applied in a series of controlled steps to various zones 112. By sequentially curing the resin 116 in the discrete zones 114, there is an appreciable reduction in the cure cycle time. In addition, the power source and the energy requirements are reduced. Curing liners by this method also reduces the equipment costs and labor costs.

The liner 110 can be used to repair large diameter conduits that are both horizontally and vertically positioned. Also, the liner 110 can be used to repair conduits that are positioned in the ground at an angle or incline. In addition, the liner 110 can be used to repair portions of conduits that are angled (non-linear), where the angle ranges between 0–90 degrees.

Spoolable Composite Pipe

Figure 12:
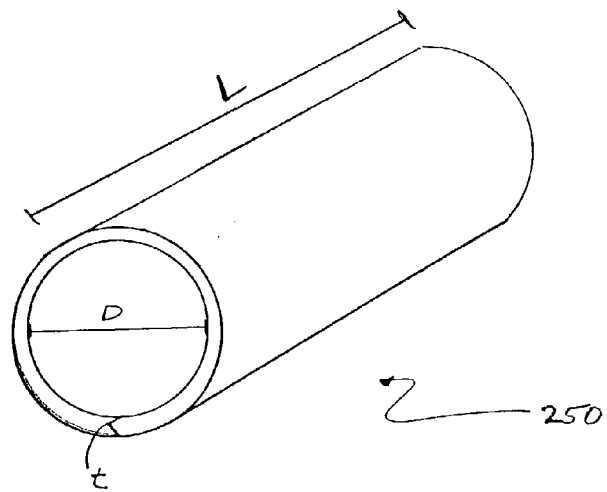
FIG. 12 is a perspective view of a composite pipe according the invention.

FIG. 12 shows a fiber reinforced thermoplastic composite pipe 210 used to repair damaged conduit. The composite pipe 210 is spoolable, meaning that it can be wrapped around and stored on a round spool. The composite pipe 210 is generally cylindrical or tubular, and has a length, L, a diameter, D, and a thickness, t. The composite pipe 210 is formed from a plurality of flexible layers. Electric current is applied to a resin in the layers to resistively heat form and consolidate the layers. The composite pipe 210 results once the layers are fully heat formed and consolidated. Prior to current being applied, the layers are positioned or nested such that they form a multi-component pipe 220.

Referring to FIG. 13, the multi-component pipe 220 includes at least an inner layer 222, an intermediate layer 224, and an outer layer 226. The flexible inner layer 222 is formed from extruding resin into a generally cylindrical, or tubular shape. The resin in the inner layer 222 is thermoplastic resin. The thickness of the inner layer 222 varies with the conduit diameter, and the inner layer 222 configurations range between SDR60 to SDR32.5.

The flexible intermediate layer 224 is formed from a winding process. As a result of the winding process, the intermediate layer 224 has a fiber architecture formed from a plurality of commingled conductive fibers 228 and thermoplastic fibers. The intermediate layer 224 is positioned about an outer surface of the inner layer 222 such that it is in intimate contact, or close proximity to the outer surface of the inner layer 222. Preferably, the conductive fibers 228 are carbon fibers. The fiber architecture of the intermediate layer 224 can include a plurality of commingled non-conductive fibers 230, which can be glass or aramid (kevlar). In addition, the conductive and/or non-conductive fibers can have thermoplastic filaments, in a composition of up to 50 percent. The intermediate layer 224 can also include a plurality of commingled synthetic fibers. The synthetic fibers can be polyester fibers, nylon, spectra, polyethylene or polyvinyl chloride. The non-conductive fibers 230 and the synthetic fibers can enhance the bonding between the layers 222, 224, 226 and the strength of the layers.

Figure 14:
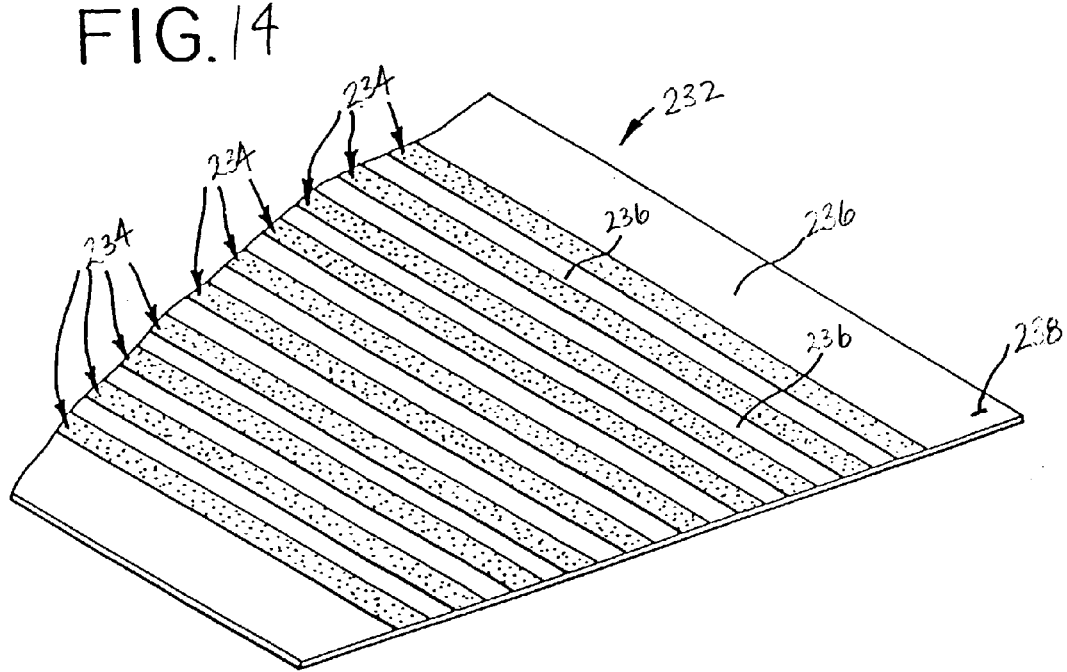
FIG. 14 is perspective view of an alternate embodiment showing a flexible intermediate layer.

Referring to FIG. 14, the flexible intermediate layer 224 can be alternately formed from conductive tape 232 having a plurality of conductive fibers 234 and a plurality of thermoplastic fibers 236. The conductive fibers 234 can be located in the inner surface 238 of the tape 232, or throughout the tape 232. The conductive tape 232 can be wrapped with a woven, stitch-bonded, or needle-punched tape. The conductive fibers 234 can be commingled carbon fibers. The tape 232 can have a plurality of commingled non-conductive fibers, which can be glass or aramid (kevlar). In addition, the conductive and/or non-conductive fibers can have thermoplastic filaments, in a composition of up to 50 percent. The tape 232 can also include a plurality of commingled synthetic fibers. The synthetic fibers can be polyester fibers, nylon, spectra, polyethylene or polyvinyl chloride. The non-conductive fibers and the synthetic fibers can enhance the bonding between the layers 222, 224, 226 and the strength of the layers.

The flexible outer layer 226 is formed from extruding resin into a generally cylindrical, or tubular shape. The resin in the outer layer 226 is thermoplastic resin. Alternatively, the outer layer 226 can be formed from wrapping thermoplastic resin tape about an outer surface of the intermediate layer 224. The thermoplastic tape does not include any conductive elements, and can be polyethylene or polyvinyl chloride. The thermoplastic tape has excellent elongation properties and is light weight. Therefore, the cost and weight of the composite pipe 210 is reduced. Also, the thermoplastic tape is generally thinner than extruded resin and as a result, a thicker intermediate layer 224 can be utilized.

Referring to FIG. 15, the process equipment discloses a portion of the method for the in-line formation of the composite pipe 210 to repair a conduit. Resin, preferably thermoplastic resin, is injected to begin the process. An extruder extrudes the thermoplastic resin to form the inner layer 222, preferably in a cylindrical shape. A plurality of conductive fibers 228 are overbraided, or wound about the flexible inner layer 222 to form a discrete intermediate layer 224. The flexible intermediate layer 224 is formed in close proximity to the outer surface of the inner layer 222. In addition to conductive fibers 228, the intermediate layer 224 can have a plurality of non-conductive fibers 230 filament-wound therein. Alternatively, the intermediate layer 224 can be formed from conductive tape 232, which can be wrapped, filament-wound, weaved, stitch-bonded, or needle-punched. Next, thermoplastic resin is extruded to form a flexible outer layer 226. Alternatively, the outer layer 226 can be formed from wrapping thermoplastic tape about an outer surface of the intermediate layer 224. Once these steps are completed, a flexible multi-component pipe 220 is formed. The pipe 220 can be cooled using inline coolers. A device for pulling the pipe 220 advances the pipe 220 to a point where pressure can be applied to by a heated deformer to deform the cross-sectional area of the pipe 220. Because the pipe 220 is formed from flexible layers 222, 224, 226, it can be deformed partially, or completely.

The deformed pipe 220 is then spooled onto a storage spool, or coil. This means that the deformed pipe 220 is wrapped about the spool. Since the pipe 220 is deformed, it consumes less space on the spool and a greater length of pipe 220 can be spooled on the spool. For example, a one-thousand foot length of deformed pipe 220 can be spooled. Alternatively, shorter lengths of pipe 220 can be spooled by employing a means for cutting the pipe 220 into shorter segments.

Once the spool is transported to a jobsite for repairing a damaged conduit, the pipe 220 can be dispensed or inserted into the damaged conduit. In its present state, the configurations of the deformed pipe 220 do not correspond or match the internal configurations of the damaged conduit. After the pipe 220 is properly positioned in the conduit, fluid pressure is applied to the pipe 220 to reshape the pipe 220. The fluid pressure can be compressed air, or a liquid, i.e. hot water or steam. While fluid pressure is being applied to the pipe 220, current is applied to the conductive fibers 228. The current resistively heats the conductive fibers 228 and heat forms and consolidates the layers 222, 224, 226. Described in a different manner, the current resistively heats the conductive fibers 228 past the melt temperature of the thermoplastic resin to consolidate the layers 222, 224, 226.

Electric leads can be connected to a power source and the conductive fibers 228 to supply the current. It has been found that 0.5–1.0 amps per bundle of conductive fibers 228 is sufficient to heat form the layers 222, 224, 226. Alternatively, using 5 volts per foot (lengthwise) of the pipe 220 is suitable to cure the resin.

Once a sufficient amount of current is applied to the conductive fibers 228, the layers 222, 224, 226 consolidate and the composite pipe 210 results. Described in a different manner, the composite pipe 210 is formed after the layers 222, 224, 226 are fully consolidated, or "tie-plied" into a single, integral unit. Prior to the formation of the composite pipe 210, the multi-component pipe 220 has multiple discrete layers 222, 224, 226. Although the composite pipe 210 is tie-plied, the internal elements, such as the conductive fibers and non-conductive fibers, remain in the composite pipe 210.

Additional pressure can be applied to the composite pipe 210 to further reshape the composite pipe 210 to correspond to the inner dimensions of the conduit and to conform to the inner surface of the conduit. Described in a different manner, additional pressure is applied to the composite pipe 210 such that it is intimate contact with the inner surface of the conduit. At that point, the composite pipe 210 lines the conduit and effectively repairs the damaged portion of the conduit. The pressure applied to reshape can vary between 3 to 40 psig.

The application of current and additional pressure can be done in a generally simultaneous step. Accordingly, the layers 222, 224, 226 can be consolidated to form the composite pipe 210 as the additional pressure forces the pipe 210 into intimate contact with the inner surface of the conduit.

An alternative composite pipe 210 has an intermediate layer 224 formed from a plurality of commingled conductive fibers 228 containing up to 50 percent thermoplastic fibers or filaments. Also, the intermediate layer 224 can have a plurality of commingled non-conductive fibers 230 containing up to 50 percent thermoplastic fibers or filaments. The conductive fibers 228 and non-conductive fibers 230 can be woven, stitch-bonded, braided, or knitted to form the intermediate layer 224.

Generally, the conductive fibers 228 and non-conductive fibers 230 have a tubular shape, and are covered with a thermoplastic film with a thickness up to 300 mills. Multiple layers of the conductive fibers 228 and non-conductive fibers 230 can be combined or plied together to form the intermediate layer 224. The resulting intermediate layer 224 and the multi-component pipe 220 are very flexible. As shown in FIG. 16, the intermediate layer 224 is so flexible and pliable that the multi-component pipe 220 virtually collapses or sags. Accordingly, the multi-component pipe 220 is does not require deformation and is easily spooled onto a storage coil. Therefore, a separate deforming element is not required.

The multi-component pipe 220 is used to repair a damaged conduit in a similar manner as described above. That means that fluid pressure is applied to reshape the multi-component pipe 220 and current is applied to the conductive fibers 228 to heat form and consolidate the layers 222, 224, 226 into an integral composite pipe 210.

A further alternate method involves forming a spoolable composite pipe 210 to be placed in a trench dug in the ground. There is no existing conduit in the trench, and the finished composite pipe 210 functions as a conduit. The finished composite pipe 210 can be employed as a conduit. The method includes the following steps, which are also discussed above: extruding resin (thermoplastic or copolymer) to form an inner layer 222; winding a plurality of conductive fibers 228, or conductive tape 232 to form an intermediate layer 224, the intermediate layer positioned about the inner layer 222; extruding resin, or wrapping thermoplastic tape to form an outer layer 226, the outer layer 226 positioned about the intermediate layer 224 to form a flexible multi-component pipe 220; applying pressure to deform the multi-component pipe 220; and, spooling the multi-component pipe 220 onto a storage coil. The multi-component pipe 220 is dispensed from the storage coil into a trench, which is formed from the removal of soil and other materials from the ground. Fluid pressure is applied to the multi-component pipe 220 to reshape the multi-component pipe 220. Current is applied to the conductive fibers 228 in the multi-component pipe 220 to resistively heat and consolidate the layers 222, 224, 226 to form the composite pipe 210. Additional fluid pressure is applied to further reshape the composite pipe 210 to a finished configuration. The finished configuration of the composite pipe 210 permits the pipe 210 to function as a conduit.

Figure 17:
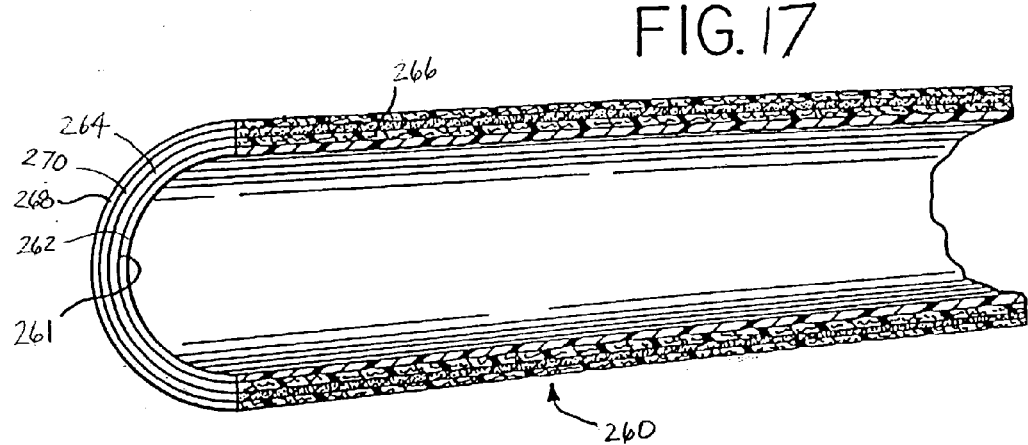

A still further alternate apparatus involves a spoolable composite pipe 250 to repair a damaged conduit, where the composite pipe 250 is formed from a plurality of individual sheets. Referring to FIG. 17, the multi-component pipe 260 includes a flexible, first sheet of extruded thermoplastic resin. The first sheet is generally flat or planar, and has a thickness ranging between 3 to 300 mills. The first sheet is deformed about a mandrel to form a cylindrical inner layer 262. Alternately, the pipe 260 could include a flexible, first film (or plurality of films) of thermoplastic resin, either extruded or blow-molded. The first film could be generally flat or tubular, and have a thickness ranging from 3 to 300 mills.

An intermediate layer 264 is formed from winding a plurality of conductive fibers 266 about an outer surface of the inner layer 262. Alternatively, conductive tape can be positioned about the outer surface 261 of the inner layer 262 to form an intermediate layer 264. The conductive tape can be wrapped, weaved, stitch-bonded, or needle-punched. The conductive tape can have a plurality of conductive fibers 266.

A flexible, second sheet of thermoplastic resin is extruded. The second sheet is generally flat and deformed about an outer surface of the intermediate layer 264 to form an outer layer 268. The second sheet has a thickness ranging from 3 to 300 mills. Alternatively, thermoplastic tape can be positioned about the outer surface of the intermediate layer 264 to form the outer layer 268. The thermoplastic tape can be wrapped, weaved, stitch-bonded, or needle-punched.

The conductive fibers 266 can be commingled carbon fibers. The intermediate layer 264 can include a plurality of commingled non-conductive fibers, which can be glass or aramid (kevlar). In addition, the conductive and/or non-conductive fibers can have thermoplastic filaments, in a composition of up to 50 percent. The intermediate layer 264 can also include a plurality of commingled synthetic fibers. The synthetic fibers can be polyester fibers, nylon, spectra, polyethylene or polyvinyl chloride. To further increase the strength and rigidity of the finished composite pipe 250, an additional layer 270 or layers can be added between the layers 262, 264, 268.

A composite pipe 250 for repairing a damaged conduit can be formed from the generally flat sheets used in the multi-component pipe 260. The formation of the composite pipe 250 comprises the following steps. Extruding a first sheet of curable thermoplastic resin. The first sheet is generally flat and has a thickness ranging from 3 to 300 mills. Deforming the first sheet about a mandrel to form a cylindrical inner layer 262 of the multi-component pipe 260. The deformation can be the result of fluid pressure or other similar forces producing deformation. A plurality of conductive fibers 266 are wound about an outer surface of the inner layer 262 to form an intermediate layer 264 of the multi-component pipe 260. Alternatively, a conductive tape can be positioned about the outer surface of the inner layer 262. The conductive tape can be wrapped, weaved, stitch-bonded, or needle-punched. The conductive tape can have a plurality of conductive fibers.

A second sheet of curable thermoplastic resin is extruded. The second sheet is generally flat and has a relatively small thickness. The second sheet is deformed about an outer surface of the intermediate layer 264 to form an outer layer 268 of the multi-component pipe 260. Alternatively, thermoplastic tape can be positioned about the outer surface of the intermediate layer 264 to form the outer layer 268. The thermoplastic tape can be wrapped, weaved, stitch-bonded, or needle-punched. Pressure is applied to deform the multi-component pipe 260, and then the pipe 260 is spooled onto a storage coil. Once the storage coil is transported to a job site, where the damaged conduit is located, the multi-component pipe is dispensed from the storage coil into the damaged portion of the conduit. In its present state, the configurations of the spooled multi-component pipe 260 do not correspond with or match the internal configurations of the damaged conduit. After the pipe 260 is properly positioned in the damaged conduit, fluid pressure is applied to the multi-component pipe 260 to reshape the pipe 260. The fluid pressure can be compressed air, or a liquid, i.e. hot water or steam.

While fluid pressure is being applied to the pipe 260, current is applied to the conductive fibers. The current resistively heats the conductive fibers 266 and heat forms the layers 262, 264, 268. Electric leads can be connected to a power source and the conductive fibers 266 to supply the current. It has been found that 0.5–1.0 amps per bundle of conductive fibers is sufficient to cure the resin. Alternatively, using 5 volts per foot (lengthwise) of the pipe is suitable to cure the resin.

Once a sufficient amount of current is applied to the conductive fibers 266, the layers 262, 264, 268 consolidate and the composite pipe 250 is formed. Described in a different manner, the composite pipe 250 is formed after the layers 262, 264, 268 are fully consolidated into a single, integral unit. Prior to the formation of the composite pipe 250, the multi-component pipe 260 has multiple discrete layers 262, 264, 268.

Additional pressure can be applied to the composite pipe 250 to further reshape the composite pipe 250 to correspond to the inner dimensions of the conduit and lines the conduit. Described in a different manner, additional pressure is applied to the composite pipe 250 such that it is intimate contact with the inner surface of the conduit. At that point, the composite pipe 250 lines the conduit and effectively repairs the damaged portion of the conduit. The pressure applied to reshape can vary between 3 to 40 psig.

The application of current and additional pressure can be done in a generally simultaneous step. Accordingly, the layers 262, 264, 268 consolidate to form the composite pipe 250 as the additional pressure forces the composite pipe 250 into intimate contact with the inner surface of the conduit.

While specific embodiments have been illustrated and described, numerous modifications are possible without departing from the spirit of the invention, and the scope of protection is only limited by the scope of the accompanying claims.

We claim:

1. An apparatus for repairing an intersection between a first conduit and a second conduit comprising:
    a body to transport repair material containing a heat curable resin to an intersection of a first conduit and a second conduit;
    an inflation device carried within said body, said inflation device capable of extending from the body and compressing said repair material to at least a portion of said intersection, said inflation device including an array of conductive fibers capable of electrically resistively heating said inflation device to effect curing of said resin in said repair material.

2. The apparatus of claim 1 wherein said conductive elements are non-ferrous.

3. The apparatus of claim 1 wherein said inflation device comprises an inflatable bladder.

4. The apparatus of claim 1 further comprising a first caul plate connected to said body, said first caul plate moveable from a retracted position to an extended position to compress a portion of said repair material against said first conduit to form a flange proximate said intersection.

5. The apparatus of claim 4 comprising a second caul plate connected to said body, said second caul plate moveable from a retracted position to an extended position to compress a portion of said repair material against said first conduit to form a flange proximate said intersection.

6. The apparatus of claim 4 wherein said first caul plate comprises an array of conductive fibers embedded in the plate proximate to an outer plate surface and capable of electrically resistively heating said first caul plate.

7. The apparatus of claim 5 wherein said second caul plate comprises an array of conductive fibers embedded in the plate proximate to an outer plate surface and capable of electrically resistively heating said second caul plate.

8. The apparatus of claim 1 further comprising skid plates connected to said body.

9. The apparatus of claim 1 wherein said body further comprises a lift cylinder to facilitate positioning of the repair material against said intersection.

10. An apparatus for repairing an intersection of a first conduit and a second conduit comprising a support structure for transporting and positioning a repair material impregnated with a heat curable resin at an intersection of a first conduit and a second conduit, said support structure housing an inflatable bladder having a plurality of conductive fibers arranged in an array for electrically generating resistive heat to facilitate curing of said resin impregnated in said material.

11. The apparatus of claim 10 further comprising a first line connected to said support structure for providing fluid pressure from a source of fluid pressure to inflate said bladder.

12. The apparatus of claim 11 further comprising a second line connected to said support structure for providing electrical energy from a power source to said conductive fibers in said bladder.

13. The apparatus of claim 10 further comprising a wing formation connected to said support structure that is retractable during transport within a conduit and is extendable from the support structure to compress a flange portion of said repair material at said intersection.

14. The apparatus of claim 13 further comprising an array of conductive fibers embedded in an outer surface of said wing portion for electrically generating resistive heat to facilitate curing of said flange portion of said repair material.

15. The apparatus of claim 14 further comprising a lift mechanism to facilitate positioning of said repair material at said intersection and extending the wing formation by pressing a first end of an actuator arm to an inner wall of a conduit, said actuator arm being connected to the support structure by an actuator bearing and fulcrum and a second end of the actuator arm connected to the wing formation.

16. A method of repairing an intersection of a first conduit and a second conduit comprising the steps of:
providing a repair material configured to conform to an intersection of a first conduit and a second conduit;
impregnating said repair material with a heat curable resin;
positioning said repair material at said intersection;
compressing said repair material against said intersection with a structure
having a plurality of electrically conductive fibers; and,
applying an electric current to said conductive fibers to resistively heat said fibers to facilitate curing of said resin in said repair material.

17. The method of claim 16 further comprising:
providing an inflatable bladder for compressing said repair material against said intersection; and,
inflating said bladder.

18. The method of claim 17 further comprising:
forming a flange in said repair material; and,
compressing said flange against a portion of said first conduit proximate said intersection.

19. An apparatus for repairing an intersection between a first conduit and a second conduit comprising:
a. a body to transport repair material wherein the body comprises:
i. a housing for an inflatable bladder;
ii. at least one retractable and extendable caul plate or wing structure attached to the body and having an outer surface that is heatable by electrical resistive heating from an array of conductive fibers within the caul plate or wing structure;
iii. a retractable and inflatable bladder that may be transported substantially within the body to an intersection of two conduits and be extended by fluid pressure from the body and be heated by electrical resistive heating from an array of conductive fibers within the bladder;
b. a first fine connected to the body for providing fluid pressure from a fluid pressure source to inflate the bladder; and
c. a second line connected to the body for providing electrical energy from a power source to the conductive fibers in the bladder and the caul plate or wing structure.

20. The apparatus of claim 19 wherein the conductive fibers are located proximate to the outer surface of the caul plate or wing structure.

21. The apparatus of claim 19 wherein the conductive fibers are located proximate to an outer surface of the inflatable bladder.

22. The apparatus of claim 19 wherein the conductive fibers comprise carbon fibers.

23. The apparatus of claim 19 wherein the electrical heating of the caul plate or wing structure is separately controlled from the heating of the bladder.

24. The apparatus of claim 19 wherein extension of the caul plate or wing structure comprises movement of components comprising an actuator arm, actuator arm bearing, and a fulcrum attached to the body.

25. The apparatus of claim 19 further comprising a tether and spindle system attached to the body and the bladder for retraction of the bladder into the body.

26. The apparatus of claim 19 further comprising the bladder detachable from the body.

* * * * *